: US 8,156,920 B2
(45) Date of Patent: Apr. 17, 2012

(12) United States Patent
Christ et al.

(54) PROCEDURE FOR THE OPERATION OF AN INTERNAL COMBUSTION ENGINE

(75) Inventors: Ansgar Christ, Sindelfingen (DE); Wolfgang Fischer, Gerlingen (DE); Andre F. Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 1092 days.

(21) Appl. No.: 11/879,341

(22) Filed: Jul. 17, 2007

(65) Prior Publication Data

US 2008/0071462 A1 Mar. 20, 2008

(30) Foreign Application Priority Data

Jul. 17, 2006 (DE) .......................... 10 2006 033 024

(51) Int. Cl.
*F02D 41/14* (2006.01)
*F02B 17/00* (2006.01)

(52) U.S. Cl. ........ 123/295; 123/299; 123/300; 123/305; 123/431; 123/435

(58) Field of Classification Search .................. 123/295, 123/299, 300, 305, 429, 431, 435
See application file for complete search history.

(56) References Cited

U.S. PATENT DOCUMENTS

| 5,975,045 | A | * | 11/1999 | Mizuno .......................... | 123/295 |
| 6,260,520 | B1 | | 7/2001 | Van Reatherford | |
| 6,390,054 | B1 | | 5/2002 | Yang | |
| 6,752,123 | B2 | * | 6/2004 | Unger et al. .................. | 123/305 |
| 7,258,104 | B2 | * | 8/2007 | Young et al. .................. | 123/432 |
| 2003/0056750 | A1 | * | 3/2003 | Fuerhapter .................... | 123/295 |
| 2004/0149255 | A1 | * | 8/2004 | zur Loye et al. .............. | 123/295 |

FOREIGN PATENT DOCUMENTS

| DE | 199 27 479 | 12/1999 |
| DE | 199 29 393 | 12/2000 |
| WO | WO 98/10179 | 3/1998 |

* cited by examiner

*Primary Examiner* — Erick Solis
(74) *Attorney, Agent, or Firm* — Merchant & Gould P.C.

(57) ABSTRACT

Procedure for the transition of an internal combustion engine, particularly a gasoline engine with direct gasoline injection and with a partially variable valve-train assembly, from an initial mode of operation into a target mode of operation, whereby the initial mode of operation and the target mode of operation are either a mode of operation with an externally-supplied ignition or one with self-ignition.
The procedure comprises the procedural steps:
  Adaptation of the operating parameters of the initial mode of operation to the required values for the target mode of operation in a map-based pilot control phase
  Changeover of the mode of operation after the map-based pilot control phase
  Closed-loop control of the operating parameters after the changeover.

11 Claims, 4 Drawing Sheets

Figure 4:
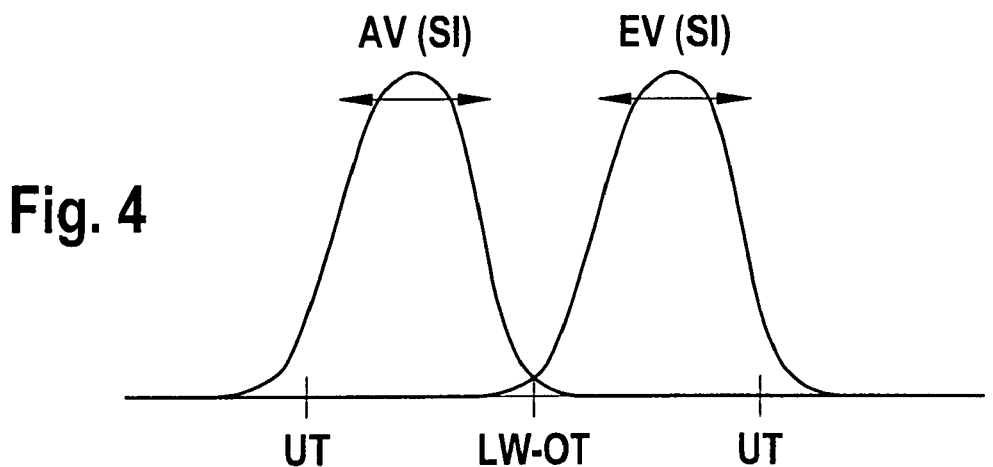

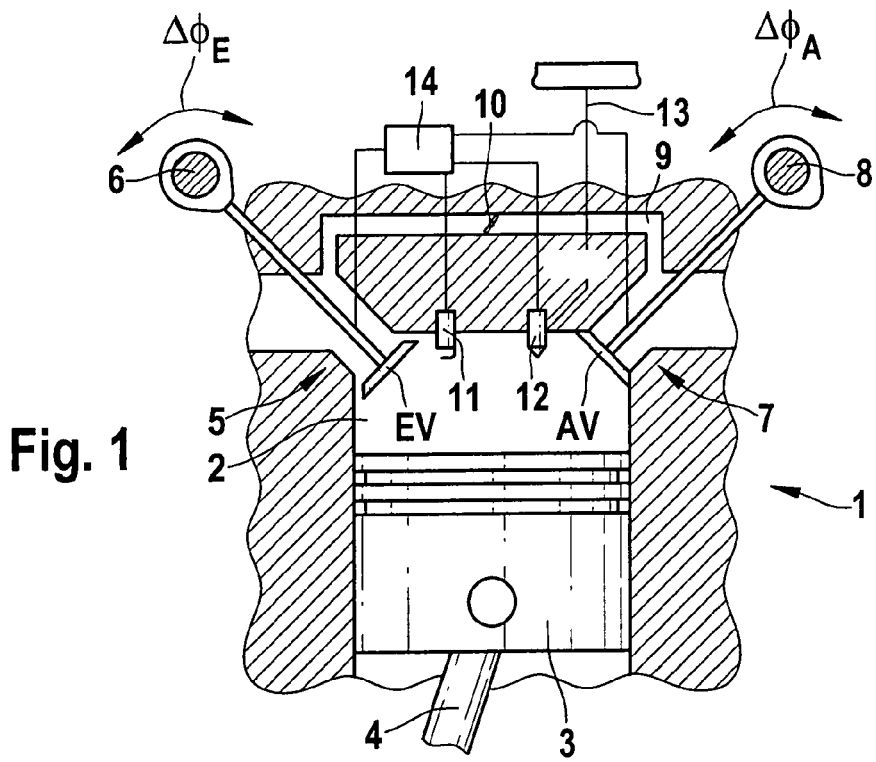
Fig. 1
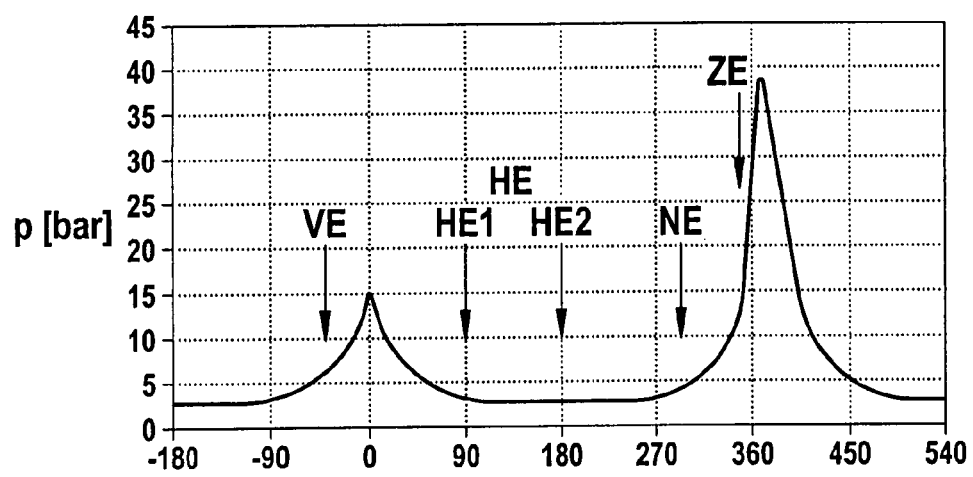
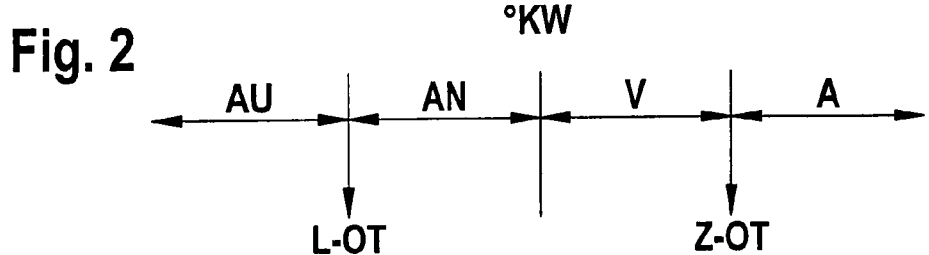
Fig. 2

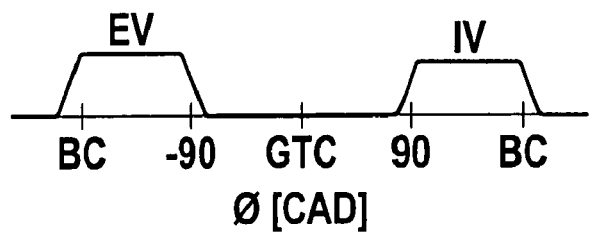
Fig. 3.1
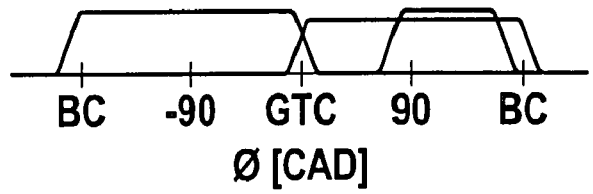
Fig. 3.2
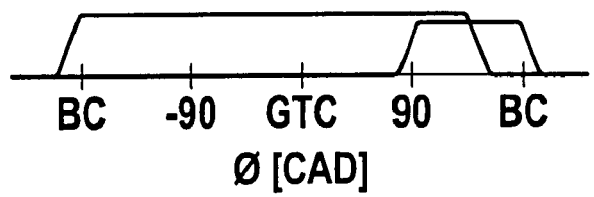
Fig. 3.3
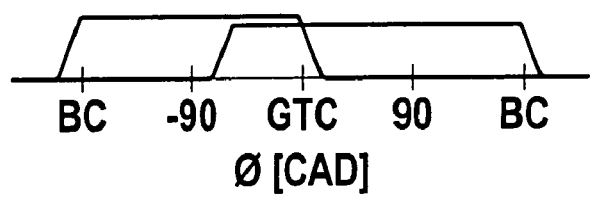
Fig. 3.4

PROCEDURE FOR THE OPERATION OF AN INTERNAL COMBUSTION ENGINE

The invention at hand concerns a procedure for the operation of an internal combustion engine, particularly a gasoline engine with direct gasoline injection and controlled self-ignition. The invention furthermore concerns a device as well as a computer program to implement the procedure.

When operating an internal combustion engine in the HCCI mode (Homogenous Charge Compression Ignition), which sometimes is also denoted as CAI (Controlled Auto Ignition), ATAC (Active Thermo Atmosphere Combustion) or TS (Toyota Soken), the ignition of the air-fuel mixture does not result from an externally-supplied ignition but from a controlled self-ignition. The HCCI combustion process can, for example, be brought about by a large proportion of residual gases and/or by a high compression and/or a high temperature of the inflowing air. A precondition for self-ignition is a sufficiently high energy level in the cylinder. Internal combustion engines capable of being driven in the HCCI mode, which can concern gasoline as well as diesel engines, are known, see, for example U.S. Pat. No. 6,260,520, U.S. Pat. No. 6,390,054, German patent 199 27 479 and patent WO 98/10179.

The HCCI combustion has the advantage of reduced fuel consumption and fewer emissions of toxic substances when compared to a conventional combustion with an externally-supplied ignition. The closed-loop control of the combustion process and especially the open-loop control of the self-ignition are, however, not simple. It thus requires a closed-loop control of the control variables influencing the combustion process for, for example, the fuel injection (quantity of fuel injected, respectively point of injection time and duration of injection), internal or external exhaust gas recirculation, intake and exhaust valves (variable valve-train system), exhaust gas backpressure (exhaust gas flap), if need be an ignition backup, inflowing air temperature, fuel quality and compression ratio (in internal combustion engines with a changing compression ratio).

In connection with combustion processes with self-ignition, the open-loop/closed-loop control of the self-ignition plays a decisive role as well as the engine-map range, where this combustion process can be deployed. Moreover the necessity exists to be able to shift quickly without regard to the torque between the mode of operation with externally-supplied ignition and that with self-ignition. This is the case because the self-ignition can be operated in the lower load range, and the shift to the mode of operation with externally-supplied ignition has to be made when moving in the direction of higher loads. New, homogeneous, gasoline driven combustion processes (gasoline self-ignition) can only be deployed in a limited engine-map range and in a very well defined thermodynamic state of the cylinder charge, whereby high temperatures are needed by means of large exhaust gas recirculation, exhaust gas recycling, exhaust gas forward displacement or exhaust gas retention.

A task of the invention at hand is therefore to present a procedure, a device and a computer program, which avoid misfires, respectively self-ignition which is too early or too late during a charge cycle of the internal combustion engine, or at least reduce their frequency.

This problem is solved by a procedure for the transition of an internal combustion engine, particularly a gasoline engine with direct gasoline injection and with a partially variable valve-train assembly, from an initial mode of operation into a target mode of operation, whereby the initial mode of operation and the target mode of operation are either a mode of operation with externally-supplied ignition or one with self-ignition. The procedure comprises the procedural steps Adaptation of the operating parameters of the initial mode of operation to the required values of the target mode of operation in a map-based pilot control phase Changeover of the mode of operation after the map-based pilot control phase Closed-loop control of the operating parameters after the changeover.

Provision is preferably made for the gas temperature to be lowered in a combustion chamber of the internal combustion engine during a transition from a mode of operation with externally-supplied ignition to one with self-ignition in the map-based pilot control phase, in that less residual gas is retained, respectively recirculated.

Provision is preferably made for a throttle valve of the internal combustion engine to be opened during the transition phase in order to increase the air intake volume and to again increase the residual gas volume at the end of the transition phase.

Provision is preferably made for a closed-loop control of a valve-train assembly, a closed-loop control of an exhaust gas recirculation, a closed-loop control of a throttle valve and a closed-loop control of a fuel injection to deploy with the changeover of the mode of operation.

Provision is preferably made for the proportion of residual gas in the cylinder to be minimized when a transition from a mode of operation with self-ignition to a mode of operation with externally-supplied ignition is made during the map-based pilot control phase.

Provision is preferably made for the throttle valve to be closed during the map-based pilot control phase.

Provision is preferably made for a closed-loop control of a valve-train assembly, a closed-loop control of an exhaust gas recirculation, a closed-loop control of a throttle valve, a closed-loop control of an ignition and a closed-loop control of a fuel injection to deploy with the changeover of the mode of operation.

Provision is preferably made for the closed-loop controls to be cycle-synchronous.

The problem mentioned at the beginning of the application is also solved by a control unit with wherewithal for the open-loop control of a transition of a gasoline engine with direct gasoline injection and with a partially variable valve-train assembly from an initial mode of operation to a target mode of operation, whereby the initial mode of operation and the target mode of operation are either a mode of operation with externally-supplied ignition or one with self-ignition. The control unit is thereby characterized, in that it comprises wherewithal for the adaptation of the operating parameters of the initial mode of operation to values required for the target mode of operation in a map-based pilot control phase, wherewithal for the changeover of the mode of operation after the map-based pilot control phase and wherewithal for the closed-loop control of the operating parameters after the changeover.

The problem mentioned at the beginning of the application is also solved by a computer program with a program code for the implementation of all steps in accordance with a procedure according to the invention, if the program is executed on a computer, particularly in a control unit.

A quick map-based pilot control and closed-loop control of such a changeover without regard for the engine torque is advantageous. A combination of map-based pilot control and cycle-synchronous closed-loop control is used according to the invention. The invention allows for the changeover from the mode of operation with externally-supplied ignition to the mode of operation with self-ignition and back again. It is thereby assumed that a partially variable valve-train assembly is available (intake valve/exhaust valve phase setting and intake/exhaust valve lift changeover).

Figure 5:
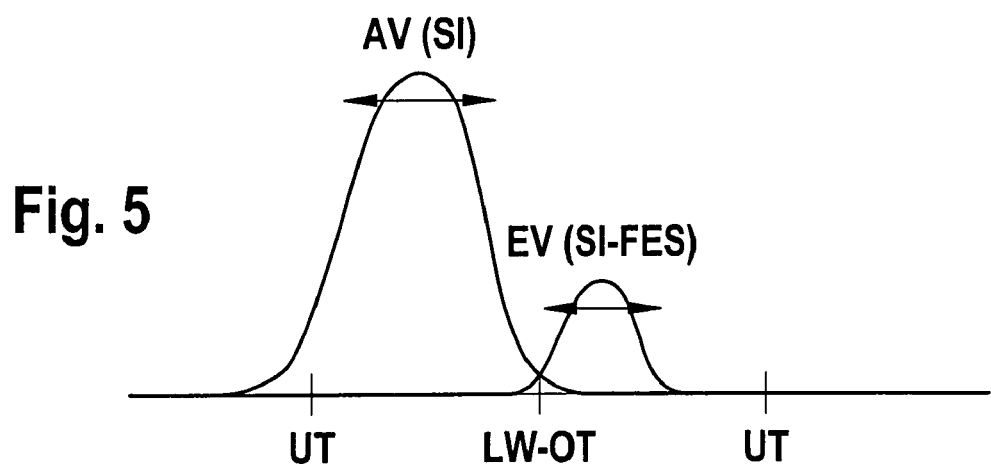
Figure 6:
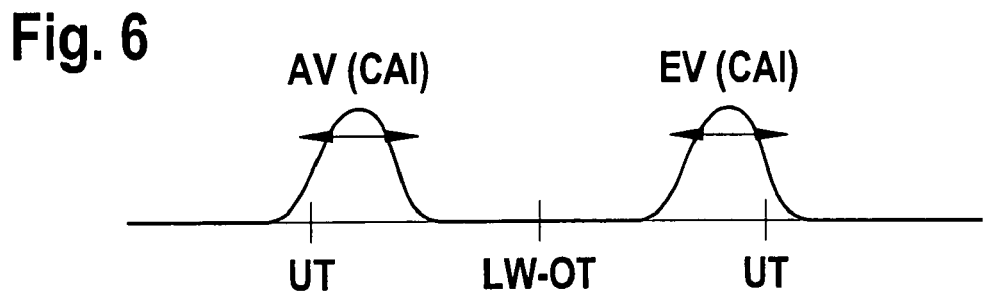
Figure 7:
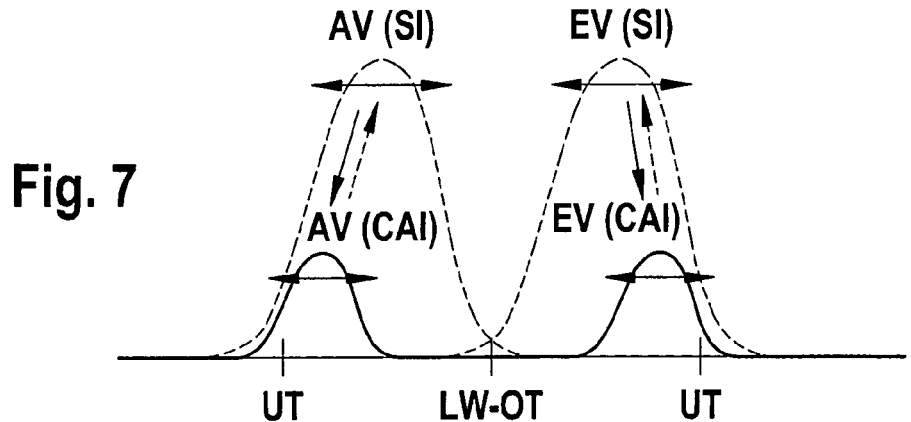
Figure 8:
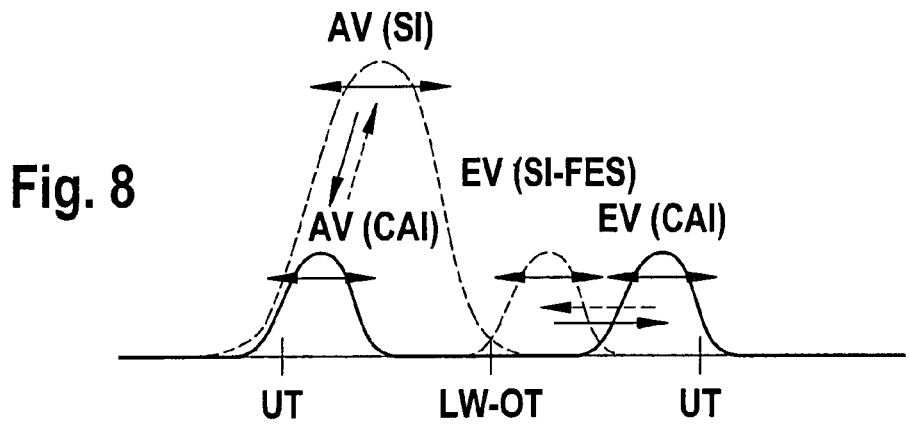
Figure 9:
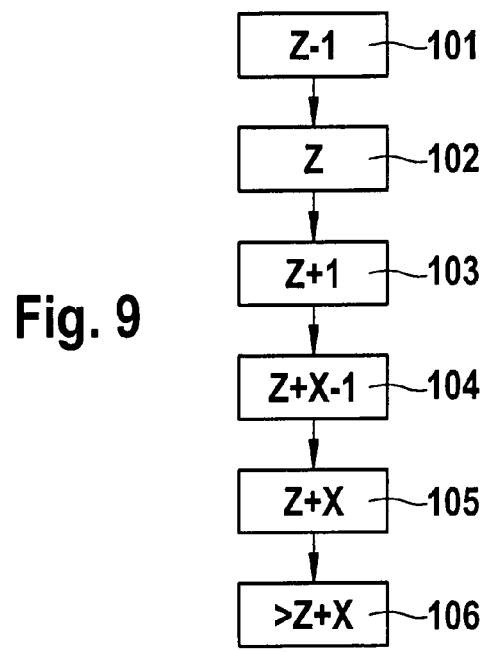

An example of embodiment of the invention at hand is subsequently explained in detail using the diagrams provided. In so doing, the following are shown:

FIG. 1 a drawing of a cylinder of an internal combustion engine;

FIG. 2 a diagram of the combustion chamber pressure plotted against the crankshaft angle;

FIG. 3 opening and closing times of the charge-cycle valves;

FIG. 4 a valve opening curve for a mode of operation with externally-supplied ignition;

FIG. 5 a valve opening curve for a mode of operation with externally-supplied ignition and early intake-closing (FES);

FIG. 6 a valve opening curve in a mode of operation with self-ignition;

FIG. 7 a valve opening curve for a completely variable valve-train assembly;

FIG. 8 a valve opening curve for a partially variable valve-train assembly;

FIG. 9 a flow chart of an example embodiment of the procedure according to the invention.

Using FIG. 1 the technological environment of the invention is first described. A cylinder 1 is depicted of an otherwise unspecified internal combustion engine, which as a rule consists of multiple cylinders. The cylinder 1 comprises a combustion chamber 2, in which a piston 3 with a connecting rod 4 is disposed in a manner capable of repositioning. The connecting rod 4 is connected to an unspecified crankshaft. An intake inlet 5 with an intake valve EV opens out into the combustion chamber 2. Additionally an exhaust outlet 7 with an exhaust valve AV opens out into the combustion chamber 2. The intake valve EV as well as the exhaust valve AV is actuated by way of an adjustable camshaft, or as depicted here with two adjustable camshafts 6, 8. The internal combustion engine is then equipped with a so-called partially variable valve control system. In the partially variable valve-train assembly like this one, which is known from the German patent DE 199 29 393, the valve timing can be shifted, i.e. valve opening and closing can jointly be altered with regard to the crankshaft angle by an angle $\Delta\phi$. The valve opening period remains constant when correlated to the superimposed crankshaft angle. For that purpose a hydraulic controller is disposed in the drive train between the crankshaft and the camshaft, which produces a relative angular adjustment between the crankshaft and the camshaft. In the case of separate camshafts, for example for intake and exhaust valves, this relative angular adjustment can take place separately by an angle $\Delta\phi_E$ for the intake valves EV and $\Delta\phi_A$ for the exhaust valves AV.

Ambient air is taken into the combustion chamber 2 by way of the intake inlet 5. The combustion exhaust gases are given off to the surrounding environment by way of the exhaust outlet 7. An exhaust gas recirculation 9 with a control valve 10 allows for a recirculation of the exhaust gases from the exhaust outlet 7 back to the intake inlet 5. Such an exhaust gas recirculation is denoted as an external exhaust gas recirculation. By means of a suitable opening time of the exhaust valve AV, for example an opening of the exhaust valve AV during the intake stroke of the internal combustion engine, a so-called internal exhaust gas recirculation can be executed; in that namely during the intake stroke of cylinder 1, exhaust gas from the exhaust outlet 7 flows back, respectively is drawn back, into the combustion chamber.

A spark plug 11 as well as an injector 12 opens out into the combustion chamber in a known manner. The injector 12 is preferably a piezoelectric injector or an electrohydraulic injector. The injector 12 is connected by way of a high pressure line 13 to an unspecified high pressure rail of the internal combustion engine. The high pressure line 13 carries fuel to the injector 12. The injector 12 is actuated electrically by a control unit 14. Correspondingly the spark plug 11 as well as the position for the camshafts of the intake valve(s) EV and for the camshaft of the exhaust valve(s) AV is controlled in an open-loop by the control unit 14. Instead of one intake valve EV and one exhaust valve AV, provision can also be made here for multiple intake valves EV and multiple exhaust valves AV to function as charge-cycle valves.

In the partially variable valve-train assembly like this one, which is known from the German patent DE 19929393, the valve timing can be shifted, i.e. valve opening and closing can jointly be altered with regard to the crankshaft angle. The valve opening period remains constant when correlated to the superimposed crankshaft angle.

FIG. 2 shows a diagram of the combustion chamber pressure in the combustion chamber 2 of the internal combustion engine plotted against the crankshaft angle in degrees of crankshaft revolution (° KW). To the right of the ordinate a crankshaft angle from −180° to 540° is depicted. The combustion chamber pressure in bar is plotted above the abscissa. Top dead center in the charge cycle L-OT is randomly selected here. The charge cycle makes for the discharge of combusted exhaust gases in a known manner. This takes place here between −180° and 0° of crankshaft revolution. The charge cycle also makes for the intake of fresh ambient air, respectively a fuel-air mixture. This takes place here in a crankshaft angle range from 0-180°. Top dead center of the ignition (ignition TDC) is achieved one crankshaft revolution further at 360° of crankshaft revolution. The compression stroke takes place between 180° and 360° of crankshaft revolution. The expansion of the combusting gases takes place between 360° and 540° of crankshaft revolution. The individual strokes are denoted in FIG. 2 with discharge AU from −180° to 0°, intake AN from 0° to 180°, compression stroke (compression) V from 180° to 360° and expansion (combustion) E from 360° to 540°. During the compression stroke V, the air, respectively fuel-air mixture or fuel-air-exhaust gas mixture, is compressed and in so doing heated. The mixture as a rule is ignited shortly before ignition top dead center has been achieved. This can occur by an externally-supplied ignition, which is customary with gasoline engines, or by a controlled self-ignition in accordance with the mode of operation according to the invention. The ignition of the mixture leads in a known way to a pressure increase, which in the immediately subsequent power stroke of expansion E is converted into mechanical energy.

In FIG. 3 the opening and closing of the intake valve N and the exhaust valve EV is depicted in each case. The exhaust valve EV in a 4-stroke engine is customarily opened in the discharge stroke between −180° and 0° of crankshaft revolution, and the intake valve N is then correspondingly opened in the range of the intake stroke between 0° of crankshaft revolution and 180° of crankshaft revolution. In FIG. 3 four cases are depicted, which in each case represent different valve opening strategies.

In FIG. 3.1 the customary valve opening strategy is depicted, in which the exhaust valve EV is opened shortly before reaching bottom dead center UT and stays open approximately until −90°. Thus, a part of the combusted exhaust gases remain in the combustion chamber 26. The intake valve N is first opened at approximately 90° of crankshaft revolution as soon as the pressure equilibrium exists between the combustion chamber 26 and the engine air intake and remains open approximately until bottom dead center is achieved. In this way a so-called negative valve overlap is brought about, which sees to it that a part of the combusted exhaust gases remain in the combustion chamber 26 and which serves to warm the fuel-air mixture brought into the combustion chamber from the engine air intake. In this way a fuel-air-exhaust gas mixture is produced in the combustion chamber 26.

FIG. 3.2 shows and alternative actuation strategy for the intake and exhaust valves. In this case the exhaust valve EV remains open between bottom dead center UT and top dead center OT, and the intake valve accordingly stays open between top dead center and bottom dead center. A very short overlapping of the valves takes place in the region of top dead center. During the opening of the intake valve N, the exhaust valve EV is additionally opened in the range of approximately 90° of crankshaft revolution up to shortly before the achievement of bottom dead center; hence, the intake valve as well as the exhaust valve is open in this range so that a part of the discharged exhaust gases is again conveyed across the exhaust valve back into the combustion chamber.

In FIG. 3.3 an additional valve control strategy is depicted, in which the exhaust valve EV stays open from bottom dead center UT across top dead center OT almost up to bottom dead center at approximately 180°. Additionally the intake valve N is opened approximately between 90° of crankshaft revolution and bottom dead center at 180° of crankshaft revolution. Combusted gas is thus discharged out of the combustion chamber 26 between bottom dead center at −180° of crankshaft revolution and the achievement of top dead center at 0° of crankshaft revolution. The combusted exhaust gas is then drawn again out of the exhaust gas system into the combustion chamber 26 between 0° of crankshaft revolution and the closing of the exhaust valve EV at approximately 120° of crankshaft revolution. The intake valve IV is open here between approximately 90° of crankshaft revolution and the achievement of bottom dead center at 180° of crankshaft revolution in order that fresh air can be drawn in during this time. A valve overlap also occurs here, in this case approximately between 90° of crankshaft revolution and 120° of crankshaft revolution.

FIG. 3.4 shows a further variation of a valve control strategy. In this case, the exhaust valve EV is open between bottom dead center at −180° of crankshaft revolution and top dead center at 180° of crankshaft revolution. The intake valve IV is open approximately from −60° of crankshaft revolution across top dead center at 0° of crankshaft revolution up to approximately bottom dead center at 180° of crankshaft revolution. Therefore, a valve-opening overlap occurs here approximately between −60° of crankshaft revolution and the achievement of top dead center at 0° of crankshaft revolution. In so doing, a part of the exhaust gas is pressed into the engine air intake and transported again back into the combustion chamber 26 during the opening time of the intake valve between top dead center at 0° of crankshaft revolution and bottom dead center at 180° of crankshaft revolution.

The valve control system in the example of embodiment of FIG. 3.1 produces a hot residual gas volume in the combustion chamber 26 and allows for a stratified fuel injection. This valve control strategy is then ideal for the stratification operation. In contrast the valve control system depicted using FIG. 3.4 is associated with a warm residual gas volume in the combustion chamber 2 and allows for a homogeneous charging of the combustion chamber 2 and in so doing for a homogeneous operation of the internal combustion engine. The valve control system according to the examples of embodiment depicted in FIGS. 3.2 and 3.3 are in each case interim solutions between the extremes depicted in FIGS. 3.1 and 3.4. Different valve and fuel injection strategies are required at different load levels. In the case of very low loads, a high residual gas rate is necessary in order to provide the required self-ignition temperature. At this engine operating point, the residual gas storage according to FIG. 3.1 is used in the combustion chamber, whereby the exhaust valve is closed significantly before the charge cycle-TDC (OT). The compression of the residual gas mass located in the cylinder leads to an additional temperature increase. The fuel injection occurs as soon as the piston is located in the region of the charge-cycle-TDC (OT). Due to the high temperatures, decomposition reactions of the fuel lead to reactive by-products, which significantly influence the self-ignition timing and in this instance reduce the self-ignition timing. Once pressure equilibrium is obtained between the intake manifold and the combustion chamber, the intake valve is opened in order to prevent losses of flow.

Moving in the direction of higher loads, the danger exists that the cylinder charge will ignite too early on account of the high temperatures; and the very fast combustion, which subsequently results, leads to pinging because small quantities of residual gas are present here. For this reason, the positive valve-opening overlap is deployed with increasing loads. This positive valve-opening overlap is depicted in the examples of embodiment for the valve control system according to FIGS. 3.2, 3.3 as well as 3.4. In the process, the required residual gas volume is drawn back out of either the exhaust port or the inlet port. The fuel injection then takes place during the compression stroke, whereby the point of injection time exerts an influence on the homogeneity of the cylinder charge. The possibility further exists to deploy an additional injection of fuel during the compression stroke. The vaporization enthalpy of the fuel causes in this instance a cooling of the cylinder charge, which works against a self-ignition occurring too early and a pinging combustion. The fuel injection during the compression stroke can also be combined with an injection of fuel into the compressed residual gas volume, provided that the valve control strategy of the residual gas storage is used according to FIG. 3.1. The combination of multiple injections of fuel beginning in the region of the charge-cycle-TDC (OT) across the intake stroke up into the compression stroke is also thereby possible as is depicted in FIG. 3.

The external exhaust gas circulation is implemented by the (partial) opening of the check valve 10. The exhaust gas discharged into the outlet port 7 is then recirculated back to the inlet port 5 by way of the exhaust gas recirculation 9 and the check valve 10, which can be brought as a butterfly valve into a desired intermediate position between a fully opened and a fully closed position. Depending on the opening of the check valve 10, more or less exhaust gas is thereby recirculated from the outlet port 7 to the inlet port 5.

Examples of embodiment of procedures, respectively changeover strategies for different operational strategies, are subsequently depicted in the externally-supplied ignition mode, particularly in the case of the valve strategy: early intake-closing (FES), which causes a dethrottling of the intake manifold and in so doing makes a reduction in fuel consumption possible, as well as in the self-ignition mode, which offers an even greater potential for a reduction in fuel consumption.

The changeover between the modes of operation—externally-supplied ignition and self-ignition—is very sensitive with regard to the thermodynamic conditions, which are especially required for the self-ignition, in order to very accurately achieve the desired combustion process. Dramatic temperature differences are, however, also to be avoided with an externally-supplied ignition because the mixture formation is thereby affected (poor mixture formation in the case of, for example, a colder charge or a high proportion of residual gas from the self-ignition of the previous cycle, which causes higher emissions). With the aid of a cycle-synchronous closed-loop control, the map-based pilot control is corrected during the changeover.

The following modes of operation are possible in the load-rotational speed engine characteristic map of a gasoline engine:
1. Externally-supplied ignition throttled by way of a throttle valve
2. Externally-supplied ignition unthrottled by way of "early intake-closing" (variable valve control system)
3. Externally-supplied ignition unthrottled in the stratification operation
4. Controlled self-ignition;
5. Mixed operation: n cylinder(s) with externally-supplied ignition, m cylinder(s) with controlled self-ignition (whereby n an m can be a desired number).

All of these modes of operation can be implemented in the 2- or 4-stroke mode. Furthermore multiple stroke procedures are also possible as, for example, 6-stroke (for example 1 respectively 2 ignited compression strokes) or 8-stroke mode (for example with cylinder cut off).

The following mode changes can be performed between these modes of operation:
1. Externally-supplied ignition throttled to self-ignition;
2. Self-ignition throttled to externally-supplied ignition;
3. Externally-supplied ignition unthrottled (early intake-closing) to self-ignition (especially when deploying a partially variable valve-train assembly);
4. Self-ignition to externally-supplied ignition unthrottled (early intake-closing) (especially when deploying a partially variable valve-train assembly);
5. Externally-supplied ignition unthrottled (stratification operation or completely variable valve-train assembly) to self-ignition;
6. Self-ignition to externally-supplied ignition unthrottled (stratification operation or completely variable valve-train assembly);
7. Self-ignition 2-stroke to self-ignition 4-stroke;
8. Self-ignition 4-stroke to self-ignition 2-stroke.

The mode changes 3. and 4. are especially important here; because as a result of the deployment of an only partially variable valve-train assembly (as for example intake-/exhaust phase setting and intake-/exhaust valve lift changeover), they can lead to very cost effective variations in order to make the advantages of both of the combustion processes possible: externally-supplied ignition with early intake closing (FES) and self-ignition.

A first example of embodiment of a procedure according to the invention for the changeover between the modes of operation, namely the changeover from externally-supplied ignition throttled (FIG. 4) to self-ignition (FIG. 6) is subsequently described. During the transition from an operation with an externally-supplied ignition to one with self-ignition, attention must be paid to the fact that a higher exhaust gas temperature, respectively exhaust gas enthalpy, is produced during the operation with an externally-supplied ignition. This means for the changeover process that less residual gas is initially retained, respectively recirculated, during a short transition phase (for example between 5 and 10 working cycles) in order to set the desired temperature, respectively enthalpy, for the self-ignition. The residual gas volume required for the self-ignition can be recirculated by way of a variable valve-train assembly, see FIG. 7, (for example a camshaft capable of changeover, a completely variable valve-train assembly or other variable valve-train systems) and/or by way of an external exhaust gas recirculation (AGR), which can be conditioned (cooled down or tempered). During the transition phase, beside a defined increase in the residual gas volume, the throttle valve has to simultaneously open by means of an open-loop or closed-loop control in order that the required volume of air can enter into the cylinder. In order that the transition proceeds as much as possible without regard to the engine torque, the cylinder charge as well as the point of injection time is selectively controlled in a closed-loop in order to achieve the desired self-ignition timing. The load in the self-ignition operation is basically set by way of the fuel mass injected; whereas the combustion state is controlled in a closed-loop by a mixture selectively set between the mass of residual gas and the mass of fresh air and by the point of injection time. A combination of map-based pilot control and cycle-synchronous closed-loop control provides the changeover with the best chance of succeeding. See Table 1.

TABLE 1

| | Changeover from an externally-supplied ignition throttled to self-ignition from cycle Z onwards | |
|---|---|---|
| Cycle | Combustion Process | Transition-Closed-loop Control |
| ... | Externally-supplied ignition | no |
| Z − 1 | Externally-supplied ignition | no |
| Z | Self-ignition | Changeover of valve-train assembly, closed-loop control of exhaust gas recirculation (AGR), throttle valve and fuel injection |
| Z + 1 | Self-ignition | Closed-loop control of valve-train assembly, exhaust gas recirculation (AGR), throttle valve and fuel injection |
| ... to Z + x − 1 | self-ignition | Closed-loop control of valve-train assembly, exhaust gas recirculation, throttle valve and fuel injection |
| Z + x | Self-ignition | End of transition |
| ... | Self-ignition | no (only closed-loop control of the self-ignition) | x = 5-10 cycles (for example)

A second example of embodiment of a procedure according to the invention for the changeover between the modes of operation, namely the changeover from self-ignition (FIG. 6) to an externally-supplied ignition throttled (FIG. 4) is described below.

During the transition from the operation with self-ignition to one with an externally-supplied ignition, attention must be paid to the fact that a lower exhaust gas temperature is produced during the operation with self-ignition. That can lead to higher emissions during the changeover. For that reason an optimal mixture formation is necessary in this stage. During the changeover, the residual gas proportion in the cylinder is minimized, for example, by way of the variable valve-train assembly, see FIG. 7, and/or by way of the external exhaust gas recirculation in order to stably produce the combustion with an externally-supplied ignition. In so doing, the throttle valve has to simultaneously close by means of a closed-loop control so that only the required air volume enters into the cylinder. Beside the charge the ignition timing and injection point of time have to be selectively controlled in a closed-loop in order to produce the desired torque. A combination of a map-based pilot control and a cycle-synchronous closed-loop control is also advantageous in this instance. See Table 2.

TABLE 2

Changeover from self-ignition to externally-supplied ignition throttled from cycle Z onwards

| Cycle | Combustion Process | Transition-Closed-loop Control |
|---|---|---|
| ... | Self-ignition | no (only closed-loop control of the self-ignition) |
| Z − 1 | Self-ignition | no (only closed-loop control of the self-ignition) |
| Z | Externally-supplied ignition | Changeover of valve-train assembly, minimization of exhaust gas recirculation (AGR), closed-loop control of valve-train assembly, exhaust gas recirculation (AGR), throttle valve, ignition and fuel injection |
| Z + 1 | Externally-supplied ignition | Closed-loop control of valve-train assembly, exhaust gas recirculation (AGR), throttle valve, ignition and fuel injection |
| ... | Externally-supplied ignition | Closed-loop control of valve-train assembly, exhaust gas recirculation (AGR), throttle valve, ignition and fuel injection |
| Z + x | Externally-supplied ignition | Externally-supplied ignition: end of transition |
| ... | Externally-supplied ignition | no (possibly closed-loop control of combustion) | x = 5-10 cycles (for example)

A third example of embodiment of a procedure according to the invention for the changeover between modes of operation, namely the changeover from an externally-supplied ignition unthrottled (FIG. 5)—early intake-closing—to self-ignition (FIG. 6), is presented. This procedure can especially be applied when deploying a partially variable valve-train assembly. During the transition from an unthrottled operation with an externally-supplied ignition into the self-ignition operation using early intake-closing (FES), attention must be paid to the fact that a higher exhaust gas temperature, respectively exhaust gas enthalpy, is produced during the operation with an externally-supplied ignition. This means for the changeover process that during a short transition phase (for example between 5 and 10 working cycles), initially less residual gas is retained, respectively recirculated, in order to set the desired temperature, respectively enthalpy, for the self-ignition. The residual gas volume required for the self-ignition can be recirculated by way of a partially variable valve-train assembly, see FIG. 8 (for example a camshaft capable of changeover, particularly here in the exhaust port for the exhaust gas retention) and/or by way of an external exhaust gas recirculation (AGR), which can be conditioned (cooled down or tempered). During the transition phase, beside a defined increase in the residual gas volume, the throttle valve has to be simultaneously controlled in an open- or closed-loop so that the required volume of air enters into the cylinder. Due to the fact that the FES strategy (early intake-closing) already represents a partial or complete dethrottling in the intake manifold, the rapid phase open-loop control and/or phase closed-loop control of the intake camshaft is especially important here. As a result of the FES strategy (early intake-closing), where the intake valves open in the proximity of the charge cycle-TDC (LW-OT) and close early (approximately 70-120° of crankshaft revolution after charge cycle-TDC (LW-OT)), see FIG. 8, the rather late phase position has to be achieved for the self-ignition, where the valves open late (approximately 70-120° of crankshaft revolution after charge cycle-TDC (LW-OT)) and close around bottom dead center UT (for example 180-240° of crankshaft revolution after charge cycle-TDC (LW-OT)). In this case it will be important to first achieve the retardation of the intake camshaft, which is necessary for the self-ignition operation (CAI), in the mode with an externally-supplied ignition and with the aid of the throttle valve (throttle to adjust the air volume) and the ignition angle (late ignition angle if necessary on account of torque neutrality). A changeover is only then to be made into the CAI operation.

In order that the transition after the changeover into the CM operation turns out to be as independent of the torque as possible, the charge as well as the point of injection time has to be selectively controlled in a closed-loop in order to achieve the desired self-ignition timing. The load in the self-ignition operation is adjusted basically by way of the fuel mass, which is injected; whereas the combustion state is controlled in a closed-loop by a selectively adjusted mixture between the mass of residual gas and that of fresh air and by way of the point of injection time. A combination of map-based pilot control and cycle-synchronous closed-loop control provides the changeover with the best chance of succeeding. See Table 3.

TABLE 3

Changeover from an externally-supplied ignition throttled to self-ignition from cycle Z onwards

| Cycle | Combustion Process | Transition Closed-loop Control |
|---|---|---|
| ... | Externally-supplied ignition | no |
| Z − 1 | Externally-supplied ignition | no |
| Z | Externally-supplied ignition | Adjustment of small intake camshaft towards retardation, closed-loop control of the exhaust gas recirculation (AGR), throttle valve, ignition angle (towards retardation to insure torque neutrality) and fuel injection (mass and timing) |
| Z + 1 | Externally-supplied ignition | Closed-loop control of valve-train assembly, exhaust gas recirculation (AGR), throttle valve and fuel injection |
| ... | Externally-supplied ignition | Closed-loop control of valve-train assembly, exhaust gas recirculation (AGR), throttle valve and fuel injection |

TABLE 3-continued

Changeover from an externally-supplied ignition throttled to self-ignition from cycle Z onwards

| Cycle | Combustion Process | Transition Closed-loop Control |
|---|---|---|
| Z + w | Self-ignition | Changeover of valve-train assembly (exhaust camshaft to smaller cam profile for residual gas retention), closed-loop control of exhaust gas recirculation (AGR), throttle valve (open), and fuel injection |
| Z + w + 1 | Self-ignition | Closed-loop control of valve-train assembly, exhaust gas recirculation (AGR), throttle valve and fuel injection |
| ... | Self-ignition | Closed-loop control of valve-train assembly, exhaust gas recirculation (AGR), throttle valve and fuel injection |
| Z + w + x | Self-ignition | End of transition |
| ... | Self-ignition | no (only closed-loop control of the self-ignition) | x, w = 5-10 cycles (for example)

A fourth example of embodiment of a procedure according to the invention for the changeover between modes of operation, namely the changeover from self-ignition (FIG. 6) to an externally-supplied ignition unthrottled—early intake-closing—(FIG. 5), is described below. This procedure can especially be used when deploying a partially variable valve-train assembly.

During the transition from the operation with self-ignition to the unthrottled operation with an externally-supplied ignition, attention must be paid to the fact that a lower exhaust gas temperature is produced during the operation with self-ignition. That can lead to higher emissions during the changeover. For that reason, an optimal mixture formation is necessary in this phase. During the changeover, the proportion of residual gas in the cylinder is minimized by way of the partially variable valve-train assembly, see FIG. 8 (Exhaust camshaft is shifted to full lift.), and/or the proportion of residual gas in the cylinder is minimized by way of the external exhaust gas recirculation in order to stably produce a combustion with an externally-supplied ignition. In so doing, the throttle valve has to simultaneously close by means of a closed-loop control; and the phase position of the intake camshaft has to simultaneously be advanced in order to operate the FES strategy (early intake-opening), whereby only the required quantity of air enters into the cylinder. When the early intake camshaft position is achieved, the throttle valve can again be opened in order to get the advantages of the FES (early intake-opening) and the dethrottling. Beside the charge, the ignition timing and point of injection time have to be selectively controlled in a closed-loop in order to produce the desired torque. On the one hand, retarding the ignition angle to assure torque neutrality in the case that the torque must be reduced and on the other hand adapting the fuel mass to create the conditions for a stable combustion can be described: Lambda=1 or slightly lean, Lambda>1. Also in this instance, a combination of map-based pilot control and cycle-synchronous closed-loop control are advantageous. See Table 4.

TABLE 4

Changeover from self-ignition to an externally-supplied ignition throttled from cycle Z onwards:

| Cycle | Combustion Process | Transition Closed-loop Control |
|---|---|---|
| ... | Self-ignition | no (only closed-loop control of the self-ignition) |
| Z − 1 | Self-ignition | no (only closed-loop control of the self-ignition) |
| Z | Externally-supplied ignition | Changeover of valve-train assembly (exhaust camshaft set to full lift for residual gas minimization) and simultaneous adjustment of the intake camshaft in the advanced direction for the production of the FES strategy (early intake-opening), minimization of the exhaust gas recirculation (AGR), closed-loop control of the throttle valve (close in a closed-loop for the selective introduction of air), ignition (towards retardation for torque neutrality) and adaptation of the fuel injection (mass and timing) |
| Z + 1 | Externally-supplied ignition | Closed-loop control of valve-train assembly, exhaust gas recirculation (AGR), throttle valve (again controlled to open in a closed-loop for dethrottling by way of the FES strategy (early valve-closing)), ignition and fuel injection |
| Z + x | Externally-supplied ignition | End of transition |
| ... | Externally-supplied ignition | no (possibly closed-loop control of combustion) | x = 5-15 cycles (for example)

During a changeover between an unthrottled externally-supplied ignition in the stratification operation (valve-train assembly as in FIG. 4) or with a completely variable valve-train assembly (FIG. 5) and self-ignition (FIG. 6), the closed-loop control strategy is very similar to the mode changes 1 and 2 during the transition from an unthrottled operation with an externally-supplied ignition to an operation with self-ignition and back. As a result of the dethrottling, a closed-loop control of the throttle valve is, however, omitted as much as possible so that the changeover process is simplified. A closed-loop control of the fuel injection, ignition and the exhaust gas recirculation AGR (internal and/or external) is, however, likewise required.

During a changeover between 2-stroke self-ignition and 4-stroke self-ignition and back, a procedure is concerned, particularly with regard to the 2-stroke operation, which actually can only be implemented with an extended variability in the valve-train assembly (for example completely variable valve-train assembly: for example an electrohydraulic or an electromechanical valve control system). The changeover here is similar to those in the preceding examples, whereby the valve-train assembly, the exhaust gas recirculation AGR and the fuel injection have to be controlled in a closed-loop. The open-loop control, respectively closed-loop control, will also possibly require supercharging.

In FIG. 9 an example of embodiment of the procedure according to the invention is depicted as a flow chart using the example of the changeover from a throttled externally-supplied ignition to self-ignition. The procedure begins at step 101 in the cycle Z−1 in the mode of operation: externally-supplied ignition throttled. In step 102, it goes into self-ignition in cycle Z. In so doing, a changeover of the valve-train assembly as well as a closed-loop control of the exhaust gas recirculation AGR, throttle valve and fuel injection results. The closed-loop control takes place up to step 104 in cycle Z+x−1. The transition ends in step 105 in cycle Z+x.

Subsequently only a closed-loop control of the self-ignition takes place in step 106 from the cycle Z+x onwards.

The invention claimed is:

1. A method of transitioning an internal combustion engine, particularly a gasoline engine with direct gasoline injection and with a partially variable valve-train assembly, from an initial mode of operation into a target mode of operation, whereby the initial mode of operation and the target mode of operation are either a mode of operation with an externally-supplied ignition or one with self-ignition, the method comprising:
    adapting operating parameters of the initial mode of operation to required values for the target mode of operation in a map-based pilot control phase;
    changing from the initial mode of operation to the target mode of operation after the map-based pilot control phase;
    controlling in a closed-loop control the operating parameters after the changeover of modes of operation; and
    during a transition from a mode of operation with an externally-supplied ignition into one with self-ignition, lowering a gas temperature in a combustion chamber of the internal combustion engine in a map-based pilot control phase and retaining less residual gas.

2. A method according to claim 1, further comprising, during the transition phase, opening a throttle valve of the internal combustion engine in order to increase air volume and increasing the residual gas volume at the end of the transition phase.

3. A method according to claim 1, further comprising, during the changeover of the mode of operation, controlling an exhaust gas recirculation, a throttle valve, and a fuel injection deploy in a closed-loop control.

4. A method according to claim 1, further comprising, during a transition from a mode of operation with self-ignition to a mode of operation with an externally-supplied ignition, minimizing a proportion of residual gas in a cylinder during the map-based pilot control phase.

5. A method according to claim 4, further comprising closing the throttle valve during the map-based pilot control phase.

6. A method according to claim 4, further comprising, during the changeover of the mode of operation, controlling a valve-train assembly, an exhaust gas recirculation, a throttle valve, an ignition, and a fuel injection deploy in a closed-loop control.

7. A method according to claim 1, wherein the closed-loop control is cycle-synchronous.

8. A computer-implemented method for transitioning an internal combustion engine, particularly a gasoline engine with direct gasoline injection and with a partially variable valve-train assembly, from an initial mode of operation into a target mode of operation, whereby the initial mode of operation and the target mode of operation are either a mode of operation with an externally-supplied ignition or one with self-ignition, the computer-implemented method comprising the steps of: adapting operating parameters of the initial mode of operation to required values for the target mode of operation in a map-based pilot control phase; changing from the initial mode of operation to the target mode of operation after the map-based pilot control phase; and controlling in a closed-loop control the operating parameters after the changeover of modes of operation; and during a transition from a mode of operation with an externally-supplied ignition into one with self-ignition, lowering a gas temperature in a combustion chamber of the internal combustion engine in a map-based pilot control phase and retaining less residual gas.

9. A method of transitioning an internal combustion engine, particularly a gasoline engine with direct gasoline injection and with a partially variable valve-train assembly, from an initial mode of operation into a target mode of operation, whereby the initial mode of operation and the target mode of operation are either a mode of operation with an externally-supplied ignition or one with self-ignition, the method comprising:
    adapting operating parameters of the initial mode of operation to required values for the target mode of operation in a map-based pilot control phase;
    changing from the initial mode of operation to the target mode of operation after the map-based pilot control phase;
    controlling in a closed-loop control the operating parameters after the changeover of modes of operation; and
    during a transition from a mode of operation with self-ignition to a mode of operation with an externally-supplied ignition, minimizing a proportion of residual gas in a cylinder during the map-based pilot control phase.

10. A control unit that controls a transition of a gasoline engine with direct gasoline injection and with a partially variable valve-train assembly from an initial mode of operation into a target mode of operation, whereby the initial mode of operation and the target mode of operation are either a mode of operation with an externally-supplied ignition or one with a self-ignition, the control unit is configured to adapt operating parameters of the initial mode of operation to required values for the target mode of operation in a map-based pilot control phase; to change from the initial mode of operation to the target mode of operation after the map-based pilot control phase; to control in a closed-loop control the operating parameters after the changeover of modes of operation; and during a transition from a mode of operation with an externally-supplied ignition into one with self-ignition, to lower a gas temperature in a combustion chamber of the internal combustion engine in a map-based pilot control phase and retaining less residual gas.

11. A control unit that controls a transition of a gasoline engine with direct gasoline injection and with a partially variable valve-train assembly from an initial mode of operation into a target mode of operation, whereby the initial mode of operation and the target mode of operation are either a mode of operation with an externally-supplied ignition or one with a self-ignition, the control unit is configured to adapt operating parameters of the initial mode of operation to required values for the target mode of operation in a map-based pilot control phase; to change from the initial mode of operation to the target mode of operation after the map-based pilot control phase; to control in a closed-loop control the operating parameters after the changeover of modes of operation; and during a transition from a mode of operation with self-ignition to a mode of operation with an externally-supplied ignition, to minimize a proportion of residual gas in a cylinder during the map-based pilot control phase.

* * * * *

UNITED STATES PATENT AND TRADEMARK OFFICE
CERTIFICATE OF CORRECTION

| | | |
|---|---|---|
| PATENT NO. | : 8,156,920 B2 | Page 1 of 1 |
| APPLICATION NO. | : 11/879341 | |
| DATED | : April 17, 2012 | |
| INVENTOR(S) | : Christ et al. | |

It is certified that error appears in the above-identified patent and that said Letters Patent is hereby corrected as shown below:

Col. 4, line 53: "intake valve N and" should read --intake valve IV and--

Col. 4, line 57: "intake valve N is" should read --intake valve IV is--

Col. 4, line 67: "intake valve N is" should read --intake valve IV is--

Col. 5, line 17: "intake valve N, the" should read --intake valve IV, the--

Col. 5, line 27: "intake valve N" should read --intake valve IV--

Col. 10, line 32: "into the CM" should read --into the CAI--

Signed and Sealed this
Sixth Day of November, 2012

David J. Kappos
*Director of the United States Patent and Trademark Office*